Figure 1:
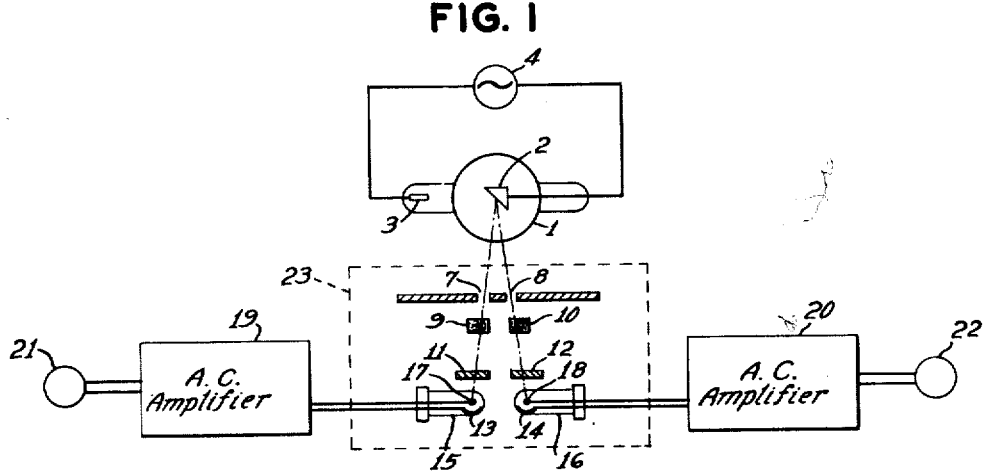

Sept. 7, 1954  F. FUA  2,688,702
X-RAY TESTING AND MEASURING METHOD AND APPARATUS
Filed March 14, 1950

INVENTOR
Frederic Fua
BY
Pennie, Edmonds, Morton and Barrows
ATTORNEYS

Patented Sept. 7, 1954

2,688,702

UNITED STATES PATENT OFFICE 2,688,702

X-RAY TESTING AND MEASURING METHOD AND APPARATUS

Frederic Fua, New York, N. Y., assignor to X-Ray Electronic Corporation, New York, N. Y., a corporation of New York Original application November 1, 1944, Serial No. 561,361. Divided and this application March 14, 1950, Serial No. 149,515

5 Claims. (Cl. 250—71)

This application is a division of my copending application Serial No. 561,361, filed November 1, 1944.

This invention relates to X-ray devices and more especially to such systems using electron tube amplifiers controlled by an X-ray beam.

A principal object of the invention is to provide a specially designed testing system using X-rays, wherein the response to the X-ray excitation can be amplified with great stability and sensitivity.

Heretofore, intesting and measuring systems using X-rays as an excitation source, variations in the power supply for the X-ray tube have usually been considered a source of trouble. For example, where the anode or target voltage of the X-ray tube is derived from a rectified and filtered A. C. power supply line, any imperfect filtering has been considered a drawback to be sedulously avoided. It has likewise been considered a drawback that the X-ray tube be energized by raw A. C. Where the output of the X-ray tube exhibits an A. C. component, there results a variable width of the resultant X-ray spectrum and a corresponding variation in the X-ray intensity.

It is a principal object of this invention to utilize the alternating current component of the X-ray excitation as a useful adjunct to enable the excitation response to be translated and amplified by stable and highly selective alternating current amplifiers.

Another object is to provide a method of translating and amplifying the X-ray excitation response for the purpose of increasing the sensitivity of the testing or measuring system as a whole.

A feature of the invention relates to an improved system for testing uniformity or the lack of uniformity of articles through the intermediary of an X-ray source and an electric wave amplifier.

Another feature relates to a method of using an X-ray tube as a testing source in conjunction with a stable alternating current electron tube amplifier.

A still further feature relates to the novel organization, arrangement and relative location of parts which cooperate to produce an improved and more sensitive X-ray measuring and testing system.

Other features and advantages not specifically enumerated will be apparent after a consideration of the following detailed description and the appended claims.

Figure 2:
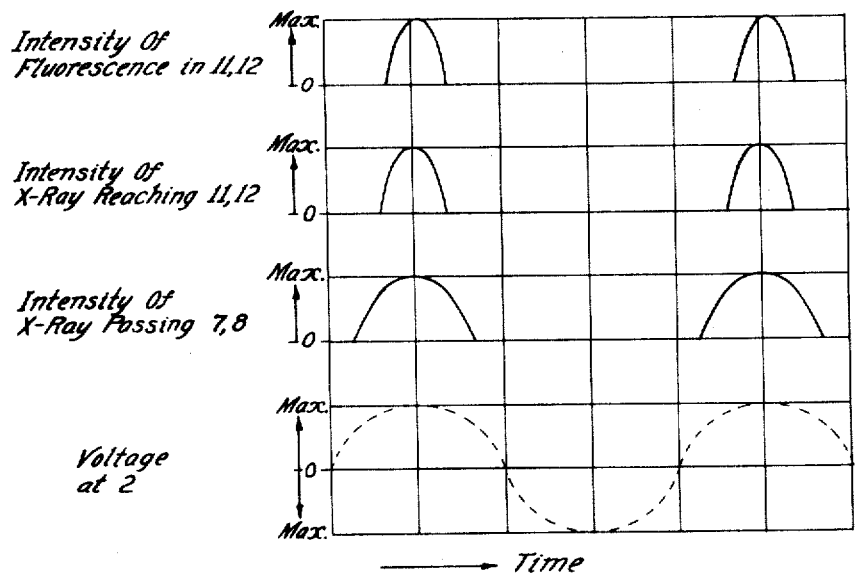

In the drawings:

Fig. 1 shows diagrammatically an X-ray activated measuring device according to the invention; and Fig. 2 illustrates graphically the operation of the invention in terms of voltage, X-ray beam intensity or signal intensity excited by the X-ray beam at various points in the device of Fig. 1.

When an X-ray tube is subjected to a cyclically variable power supply for the anode or target voltage, the output of the X-ray tube will vary correspondingly in frequency and in intensity. If this output impinges on a suitable X-ray responsive screen such as a fluorescent screen, the light emitted by the screen will vary in consonance with the X-ray variations, except for the inherent time lag of the fluorescent material. If the light from the screen is projected on a photoelectric cell or the like, the time lag in the fluorescent screen will tend to displace the instants of maximum and minimum excitation of the electron tube amplifier connected to the photoelectric cell, and the non-linearity of response of the fluorescent screen to X-ray excitations of different amplitude, will tend to reduce the difference between the said maximum and minimum amplifier excitation.

However, for a given X-ray tube operating with a certain voltage-time characteristic of the target or anode supply, during each of the successive cycles of variation of that supply, all other factors remaining the same, both the frequency spectrum and the intensity output of the X-ray tube will vary in the same manner. That is to say, the frequency of the X-ray spectrum and its intensity-versus-time will vary with the cyclical variation in the anode voltage supply. Therefore, the X-ray excitation of a fluorescent screen detector will follow an identical pattern during the successive cycles and will transmit identical excitations to an electron tube amplifier connected to the detector and the peak, mean, or average values of these excitations, will remain identical over successive cycles.

These excitations being regularly recurrent and continuously variable over each cycle, are in accordance with the present invention, amplified by an electron tube amplifier of the alternating current type which can be designed so as to be sufficiently selective to respond only to a very narrow frequency band corresponding to the frequency of excitation of the X-ray responsive fluorescent screen. This results in a corresponding decrease in the noise level of the amplifier and an increased non-responsiveness to extraneous undesirable excitations. These phenomena are graphically indicated in Fig. 2, with reference to the particular apparatus of Fig. 1.

If, however, with an X-ray tube energized as above mentioned the intensity of the beam exciting the X-ray fluorescent screen is modulated or changed to a new value by the introduction of an absorbing medium in the X-ray path, the peak, mean or average value of the excitation voltage impressed on the amplifier over each cycle will vary and this will correspondingly vary the output of the amplifier. Therefore, the peak, mean or average value of this amplified signal can be used, as a measure of the absorption of the inserted medium, this measurement being either in absolute or relative values.

Such an arrangement is schematically illustrated in Fig. 1 of the drawing, wherein there is represented any well-known form of X-ray tube 1, the anode or target 2 and the cathode 3 of which are supplied with power from an A. C. supply source 4. The current through the X-ray tube under these circumstances will be a pulsating, intermittent direct current having a regularly recurrent component.

The X-ray beam from tube 1 is passed through a plurality of slits 7, 8, in alignment with which are two materials 9, 10, one of which may be a standard of known density or X-ray absorption power, and the other of which may be a material whose density or absorption power is to be compared with the standard. The divided beam, after passage through the bodies 9 and 10, impinges on two respective screens 11, 12, which have the property of becoming fluorescent under X-ray excitation. These screens may be of any construction well-known in the X-ray art. The fluorescent light from each of the screens 11 and 12 is projected upon the photosensitive cathodes 13, 14, of a corresponding pair of photoelectric cells 15, 16, whose anodes are respectively 17 and 18. The cells 15 and 16 are connected to respective alternating current amplifiers 19, 20, whose amplified outputs are applied respectively to suitable meters or indicators 21, 22. In accordance with the invention, the amplifiers 19 and 20 are tuned so as to have a greater sensitivity at approximately the frequency of the A. C. supply source 4. With this arrangement, the amplifiers 19 and 20 may be designed with the requisite stability and high gain so as to enable very much smaller variations between the divided portions of the X-ray beam to be detected. For typical descriptions of a suitable organization of testing apparatus in which the system of Fig. 1 may be embodied, reference may be had to the copending Fua and Woods application Serial No. 558,928, filed October 16, 1944. Since the sensitivity of the narrow band alternating current amplifier 19, 20, can be extremely high before reaching the noise level, and as the gain of such an A. C. amplifier is much less responsive to voltage supply level variations and other extraneous variations, than is a D. C. amplifier, the combination of an X-ray beam cyclically varied, and an A. C. amplifier as disclosed in Fig. 1, will give an overall sensitivity not obtainable heretofore in the detection and measurement of very weak X-rays.

The various meters or indicators 21, 22 can be calibrated under control of a suitable calibrated gain control in the respective A. C. amplifiers, which gain controls can be designed and calibrated in terms of X-ray intensities or relative or absolute absorption powers of articles to be subjected to the X-ray excitation. Instead of using two separate meters 21 and 22 as in Fig. 1, the outputs of the amplifiers 19 and 20 can be fed in opposition to a single meter. No reading, therefore, will appear on this meter as long as the two screens 11 and 12 are equally excited and if the gains of the amplifiers 19 and 20 are correctly balanced. If, however, an absorption medium 10 of any kind is placed in the path of one of the beams, a definite reading will show in the output meter and this will be a measure of the X-ray intensity striking screen 12 as compared to the steady excited screen 11. Such an arrangement has the advantage that the equipment is intensitive to fluctuations which affect the two portions of the divided beam equally.

It will be clear from the foregoing that, if desired, the alternating power supply 4 may be a specially designed A. C. power source having a frequency which is well removed from any disturbing frequencies. For example, if source 4 is of 25 cycles the equipment may be used quite close to powerful 60 cycle sources without introducing disturbances. In this event, of course, the amplifiers 19 and 20 will be designed to have a band pass characteristic between 20 and 30 cycles and, if desired, with a rejection filter for the 60 cycles.

I claim:

1. Apparatus for the testing of material by the precise and accurate measurement of X-ray penetrating the material including, in combination, an X-ray tube having conventional heated cathode and target anode, a source of alternating current of predetermined frequency and voltage impressed across said cathode and anode, means for interposing material to be tested in the path of an X-ray beam from said tube, a fluorescent screen in the path of said beam beyond said material from said tube, an electron-emissive photocell responsive to fluorescence of said screen, an alternating current amplifier tuned to have a narrow band-pass corresponding to said frequency, said amplifier receiving the output of said photocell as input, and a quantitatively responsive meter for measuring the amplitude of the peaks of the output of said amplifier.

2. The method of detecting and precisely and accurately measuring small variations in the X-ray opacity of materials which includes feeding an X-ray source with an alternating current power supply, receiving a beam of X-ray from said source passed through the material to be tested upon a fluorescent screen, permitting the fluorescence of said screen to activate an electron-emissive photocell, feeding the output of said photocell to a highly selective alternating current amplifier, tuning said amplifier to have a narrow band-pass corresponding to the frequency of said power supply, and precisely measuring the amplitude of the peaks of the output of said amplifier.

3. Apparatus for precisely and accurately measuring the X-ray opacity along a given path through an object to be measured which includes an X-ray tube having conventional heated cathode and target anode, a source of alternating current of predetermined frequency and voltage impressed across said cathode and anode, means for passing a beam of X-ray from said tube through the object to be measured, a fluorescent screen arranged to receive said beam after its passage through said object, an electron-emissive photocell arranged to receive the fluorescence from said screen, a comparison standard electric current having settable values of an order comparable to those of the output current of said photocell, alternating current amplifying means responsive to said comparison current and said output current connected to said amplifying means between said comparison current and said output current, and indicator means connected to said amplifying means for indicating the sign and magnitude of the difference between said comparison current and said output current.

4. Apparatus for precisely and accurately comparing physical characteristics of a material with a standard sample of said material which includes an X-ray tube having conventional heated cathode and target anode, a source of alternating current of predetermined frequency and voltage impressed across said cathode and anode, means for defining two separate beams of X-ray from said tube, means for passing one of said beams through the material to be compared, means for passing the other of said beams through the standard sample, a first fluorescent screen arranged to receive the beam passing through the material to be compared, a second fluorescent screen arranged to receive the beam passing through the standard sample, a first electron-emissive photocell arranged to receive the fluorescence of said first screen, a second electron-emissive photocell arranged to receive the fluorescence of said second screen, alternating current amplifying means responsive to the outputs of said photocells, and indicator means connected to said amplifying means for indicating the difference between said output currents.

5. Apparatus for precisely and accurately measuring the thickness of a moving web including, in combination, an X-ray tube having conventional heated cathode and target anode, a source of alternating current of predetermined frequency and voltage impressed across said cathode and anode, means for defining two separate beams of X-ray from said tube, means for conducting the web across the path of one of said beams, means for interposing a standard sample of the web being measured in the path of the other of said beams, a first fluorescent screen arranged to receive the beam passing through the moving web, a second fluorescent screen arranged to receive the beam passing through the standard sample, a first electron-emissive photocell arranged to receive the fluorescence of said first screen, a second electron-emissive photocell arranged to receive the fluorescence of said second screen, alternating current amplifier means responsive to the outputs of said photocells, and indicator means responsive to the output of said amplifier means for indicating the difference between said outputs.

References Cited in the file of this patent

UNITED STATES PATENTS

| Number | Name | Date |
|---|---|---|
| 1,211,092 | Coolidge | Jan. 2, 1917 |
| 2,264,725 | Shoupp et al. | Dec. 2, 1941 |
| 2,301,251 | Capen | Nov. 10, 1942 |
| 2,513,818 | Roop | July 4, 1950 |

FOREIGN PATENTS

| Number | Country | Date |
|---|---|---|
| 482,354 | Great Britain | June 19, 1936 |
| 30,371 | France | Feb. 2, 1926 |

OTHER REFERENCES

"Fundamentals of Engineering Electronics," Dow, published by John Wiley & Sons, Inc., New York city, 1937; page 282. (Copy in Div. 54.)

"Continuous Gaging With X-ray Micrometer," Woods and Fua, The Iron Age, November 29, 1945, pp. 50–51, 250–83D.

Certificate of Correction

Patent No. 2,688,702                                              September 7, 1954

Frederic Fua

It is hereby certified that error appears in the printed specification of the above numbered patent requiring correction as follows:

Column 4, line 15, for "intensitive" read *insensitive*;

and that the said Letters Patent should be read as corrected above.

Signed and sealed this 26th day of October, A. D. 1954.

[SEAL]

ARTHUR W. CROCKER,
*Assistant Commissioner of Patents.*